April 30, 1940. L. L. SMALLEY 2,198,923
REMOTE INDICATOR FOR SERVICE EQUIPMENT
Filed May 27, 1937 3 Sheets-Sheet 2
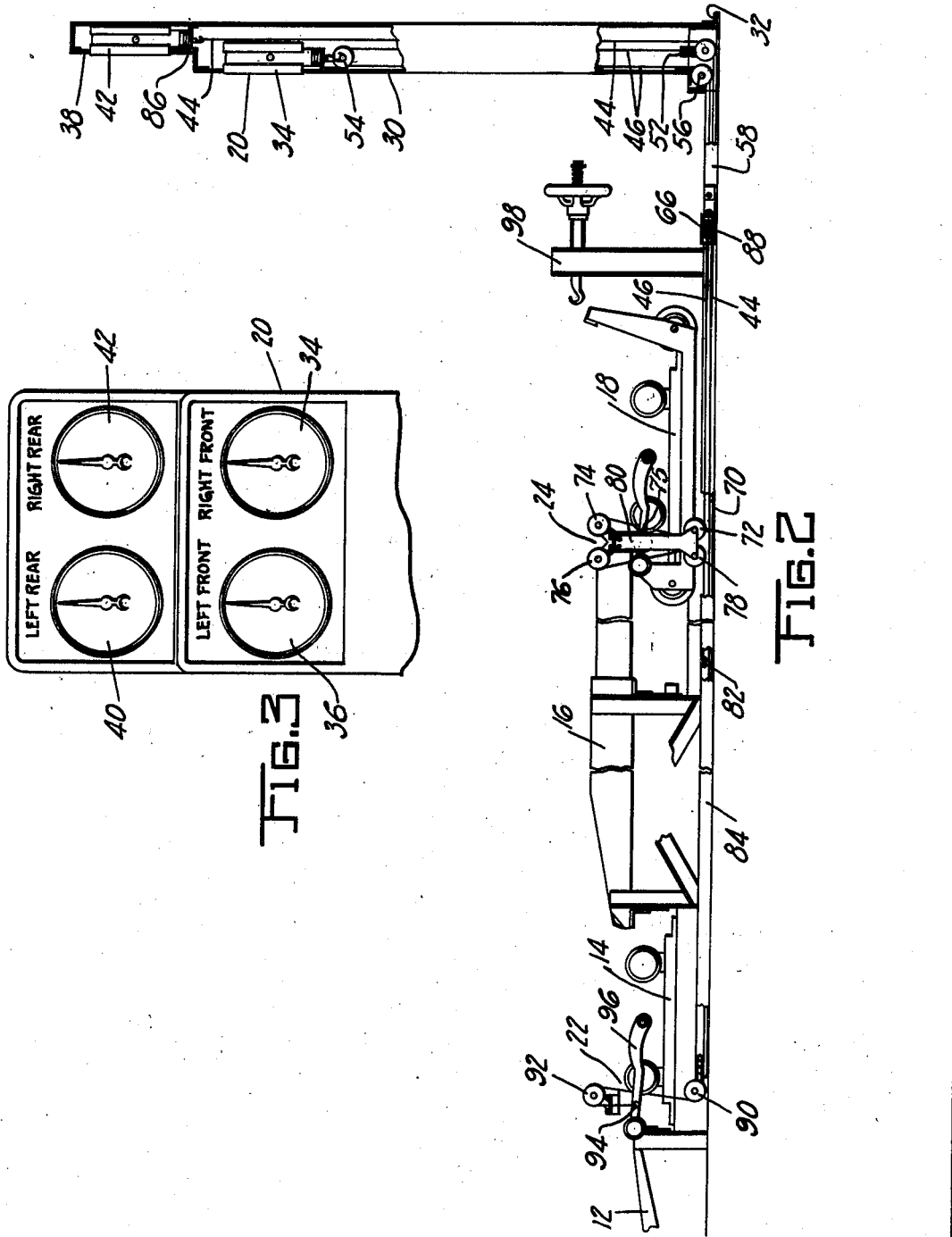
INVENTOR
LEE L. SMALLEY
BY
H. Q. Clayton
ATTORNEY April 30, 1940.   L. L. SMALLEY   2,198,923
REMOTE INDICATOR FOR SERVICE EQUIPMENT
Filed May 27, 1937   3 Sheets-Sheet 3
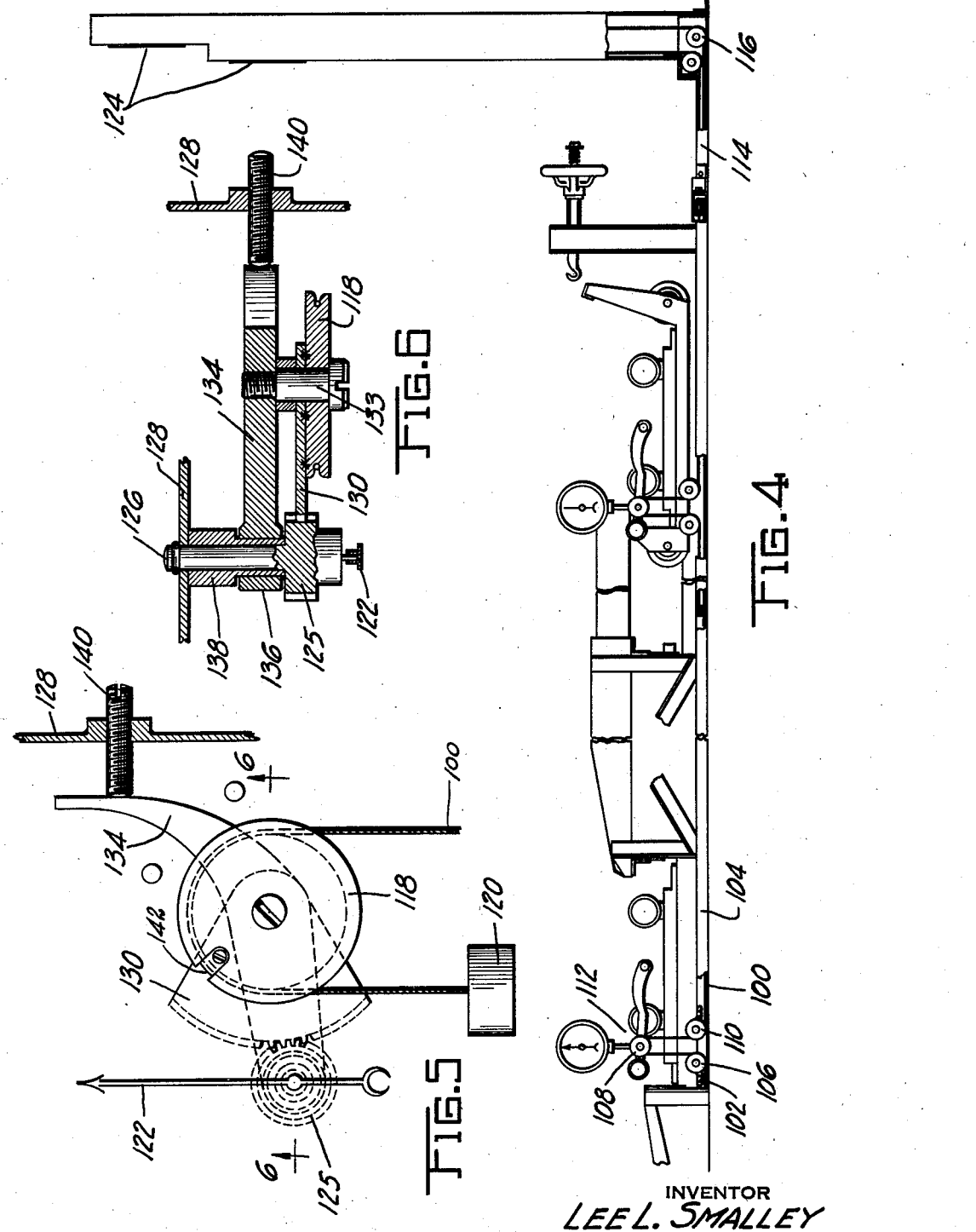
INVENTOR
LEE L. SMALLEY
BY
H. Q. Clayton
ATTORNEY Patented Apr. 30, 1940

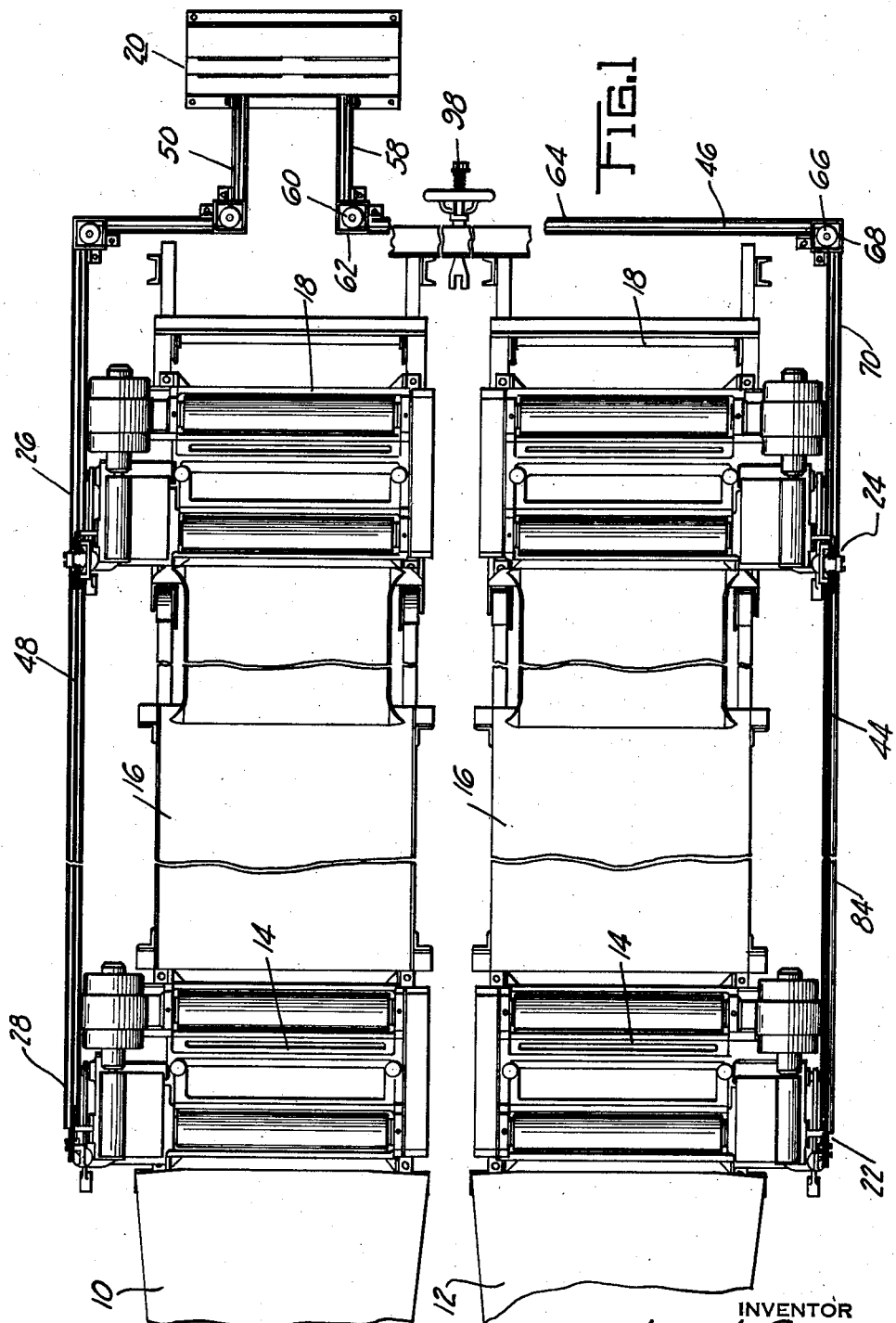

2,198,923

UNITED STATES PATENT OFFICE 2,198,923

REMOTE INDICATOR FOR SERVICE EQUIPMENT

Lee L. Smalley, South Bend, Ind., assignor to Bendix Products Corporation, South Bend, Ind., a corporation of Indiana Application May 27, 1937, Serial No. 144,994

1 Claim. (Cl. 265—25)

This invention relates to the testing of automobiles or the like and is illustrated as embodied in mechanism for testing a set of four-wheel automobile brakes.

An object of the invention is to provide an apparatus for measuring brake resistance at a factory, garage or service station so as to avoid road tests.

The principal object of the invention, however, is to provide a simple, yet effective, indicator or telltale mechanism for a brake tester, whereby the operator, seated in the driver's seat, may clearly observe the results of the tests being made.

In one desirable and simplified arrangement, a brake tester unit of a design such as that disclosed in Patent No. 1,767,348, dated June 24, 1930, to C. F. Cowdrey, is outlined by the telltale mechanism comprising an indicator panel, preferably mounted immediately to the left front of the tester unit, the dials on the panel being connected with the brake resistance measuring mechanism, adjacent each wheel, by a flexible tape.

Yet another object of the invention is to provide a remote indicator mechanism for an automotive brake tester unit which, without adjustment, will cooperate with a unit adapted to test the brakes of cars of different wheel base.

To this end there is provided means for so interconnecting the aforementioned tape with the scale beams of the tester unit as to permit a bodily movement of the beams without in any manner necessitating an adjustment of the tape.

The invention also contemplates the provision of a compact and inexpensive means for correcting the zero position of the indicator dials.

Other objects of the invention and desirable details of construction and combinations of parts will become apparent from a detailed description of certain embodiments of the invention, taken in conjunction with the accompanying drawings illustrating said embodiments, in which:

Figure 1 is a plan view of a brake tester mechanism including my telltale mechanism;

Figure 2 is a side elevational view of the mechanism of Figure 1;

Figure 3 is a partial view of the indicator panel of the mechanism constituting my invention;

Figure 4 is a side elevational view of a modified form of telltale mechanism, incorporating therein means for setting the zero position of the indicator pointer;

Figure 5 discloses, in detail, the pointer setting means of Figure 4; and

Figure 6 is a sectional view of the mechanism of Figure 5, the section being taken on line 5—5 thereof.

The illustrated apparatus comprises ramps 10 and 12, preferably detachably connected to carriages 14. Channel-shaped runways or tracks 16 are positioned on each side of the apparatus and serve to interconnect the aforementioned carriages with carriages 18, adjustably movable to accommodate the brake tester unit to automobiles of different wheel base.

The mechanism constituting my invention consists of remote indicator means, and, as clearly disclosed in Figures 1 to 3 of the drawings, the principal elements of the mechanism include a panel 20, positioned to the front and left of the brake testing apparatus, and flexible connecting means, mounted in housings interconnecting the panel with the scale beams of brake resistance measuring units 22, 24, 26 and 28.

Describing now in greater detail the indicator mechanism, the indicator panel comprises a casing 30, preferably, though not necessarily, secured to the floor by fastenings 32. The upper end portion of the casing provides a compartment housing dials 34 and 36, the former serving to indicate the resistance of the right-front brake and the latter the left-front brake. From the upper end of the casing there projects a casing 38, serving as a housing for the left-rear and the right-rear brake indicator dials 40 and 42 respectively.

The indicator dials just described are preferably interconnected with the testing units 22, 24, 26 and 28 by means of flexible steel tapes 44, 46, 48 and 50. The tape 46, interconnecting the right-front indicator dial 34 with the unit 24, is fixedly secured at one of its ends 52 to the casing 30. From this end the tape is wound about a sheave 54 carried by the dial 34, about a sheave 56 mounted in the bottom of the casing 30, thence into a box-like housing member 58. The tape is then passed about a sheave 60 journaled within a casing 62, and thence extends, through a box-like housing 64, to a sheave 66 journaled within a casing 68, positioned opposite the right-front corner of the brake tester unit. The tape continues within a channel member 70, thence about sheaves 72 and 74, thence about a sheave 75 carried by the scale beam, thence about sheaves 76 and 78, and ends, secured at 82, within another box-like housing 84. The sheaves 72, 74, 76 and 78 are mounted on a standard 80 supported on the movable carriage 18. The channel member 70 is provided to permit a movement of the adjustable carriage 18, or rather a freedom of movement of the tape 46 during the movement of the carriage.

Describing now the connection between the right-rear brake indicator dial 42 and the measuring unit 22, the tape 44 extends from its end 86 fixed to the dial 42 through the housing 58 and about a sheave mounted immediately below the sheave 60 within the casing 62. From said sheave the tape 44 extends through the housing 64, about a sheave 88 mounted immediately below the sheave 66, thence through the channel 70 and housing 84, about a sheave 90 at one end of the housing 84, thence about a sheave 92 mounted on the measuring unit 22, and is secured at its end 94 to the scale beam 96 of said unit.

Connections between the indicator dials 36 and 40 and the left-front and rear measuring units 26 and 28 duplicate the aforementioned connections. Therefore, a detailed description of said connections is believed to be unnecessary.

Briefly describing the operation of the brake testing apparatus, the vehicle is driven upon the carriages 14 and 18 and secured to an anchor 98. Proceeding with the testing of the brakes, the driver need not leave his seat, inasmuch as the indicator dials of the panel 20 are clearly visible from the driver's compartment. The degree of angular movement of the scale beams measuring the resistance of the brakes is indicated remotely by the dials within the panel.

There is disclosed in Figures 4, 5 and 6 a modified form of remote indicator device. As disclosed in Figure 4, a tape 100 is secured at its end 102 within a housing 104. The tape continues about the sheaves 106, 108 and 110 of a brake tester 112, thence through a housing 114, about a sheave 116, about a sheave 118, around sheaves corresponding to sheave 60 in Figure 1 and 88 in Figure 2, and at its end is secured to a weight 120.

There is disclosed in Figures 5 and 6 a mechanism for correcting the position of the pointer 122 of a dial 124. A pinion 125, mounted on the end of a shank 126 secured to a casing 128, is in mesh with a sector 130 rigidly secured to the sheave 118, the latter being pivotally mounted at 133 upon a lever adjusting member 134. The lever member 134 is journaled, or rather fulcrumed, at its end 136 upon a bushing 138, the latter constituting a bearing for the shank 126.

Describing now the operation of the aforementioned adjusting mechanism, upon rotating a screw 140 mounted in the casing 128, the sheave 118 and sector 130 are bodily moved with the angular movement of the lever 134 to thereby rotate the pinion 125. The pointer 122 is thus returned to its zero position without affecting the subsequent operation of the indicator mechanism. During the correcting operation, the tape 100, which is keyed to the sheave 118 at 142, is merely more completely wrapped about the sheave.

There is thus provided a simple, compact and effective remote indicator mechanism readily applied to brake tester units employing a movable front carriage to adjust the unit for cars of different wheel base.

Although this invention has been described in connection with certain specific embodiments, the principles involved are susceptible of numerous other applications that will readily occur to persons skilled in the art. The invention is, therefore, to be limited only as indicated by the scope of the appended claim.

I claim:

A brake testing apparatus comprising a frame, carriages mounted in said frame, one of said carriages being movable relatively to the frame to accommodate vehicles of various wheel bases, means for measuring the braking resistance of each of the wheels of the vehicle and located adjacent said wheels, and means for indicating the degree of braking resistance, said latter means comprising a central panel housing dials, and further comprising means interconnecting said measuring means with said dials, and so constructed as to be unaffected by the movement of the aforementioned carriage and its brake measuring units, said interconnecting means including box-like casing members positioned alongside the two sides and front of said frame and thence extending to the aforementioned panel, a flexible tape member having one end thereof secured within said panel and thence extending (1) through those casing members interconnecting the panel with the right-front brake resistance measuring means and (2) about sheaves on said latter means, and another flexible tape member extending from said panel to the left-front brake resistance measuring means, said latter tape being (1) housed within the aforementioned casing members on the left side of the frame and (2) extending about sheaves on the left-front brake resistance measuring means, both of the said tapes being secured to the respective casing members.

LEE L. SMALLEY.